United States Patent
Kornbluth et al.

(10) Patent No.: US 11,884,560 B2
(45) Date of Patent: Jan. 30, 2024

(54) CONVERSION MATERIALS FOR ELECTROCHEMICAL WATER SOFTENING

(71) Applicant: Robert Bosch GmbH, Stuttgart (DE)

(72) Inventors: Mordechai C. Kornbluth, Brighton, MA (US); Jonathan Mailoa, Cambridge, MA (US); Soo Kim, Cambridge, MA (US); Georgy Samsonidze, San Francisco, CA (US); Boris Kozinsky, Waban, MA (US); Saravanan Kuppan, Sunnyvale, CA (US); Sondra Hellstrom, East Palo Alto, CA (US); Nathan Craig, Burlingame, CA (US)

(73) Assignee: Robert Bosch GmbH, Stuttgart (DE)

( * ) Notice: Subject to any disclaimer, the term of this patent is extended or adjusted under 35 U.S.C. 154(b) by 983 days.

(21) Appl. No.: 16/591,199

(22) Filed: Oct. 2, 2019

(65) Prior Publication Data

US 2020/0123027 A1 Apr. 23, 2020

Related U.S. Application Data

(60) Provisional application No. 62/749,087, filed on Oct. 22, 2018.

(51) Int. Cl.
*C25B 11/00* (2021.01)
*C02F 1/461* (2023.01)
(Continued)

(52) U.S. Cl.
CPC ........ *C02F 1/46109* (2013.01); *C02F 1/4602* (2013.01); *C02F 5/00* (2013.01); *C02F 2001/46133* (2013.01)

(58) Field of Classification Search
CPC ...... C02F 1/46109; C02F 1/4602; C02F 5/00; C02F 2001/46133
See application file for complete search history.

(56) References Cited

U.S. PATENT DOCUMENTS 6,309,532 B1 10/2001 Tran et al.
9,701,548 B2 7/2017 Mehmi et al.
(Continued)

FOREIGN PATENT DOCUMENTS

CN 104108771 A 10/2014
CN 105980315 A 9/2016
(Continued)

OTHER PUBLICATIONS

The Materials Project, available at www.materialsproject.org, publicly accessible at least as early as Oct. 21, 2018.
(Continued)

*Primary Examiner* — Zulmariam Mendez
(74) *Attorney, Agent, or Firm* — Maginot, Moore & Beck LLP

(57) ABSTRACT

A water softening device includes a container configured to contain water, first and second electrodes arranged in fluid communication with the water, and a power source. The first electrode includes a conversion material that has a first composition and a second composition coexisting with the first composition. The first composition includes calcium ions bonded thereto and the second composition includes sodium ions bonded thereto. The power source supplies current in a first operating state such that the second composition exchanges sodium ions for calcium ions in the water to generate a soft water solution. The first and second electrodes are connected in a second operating state such that the first composition exchanges calcium ions for sodium ions in the water to generate a wastewater solution. The conversion material undergoes a reversible conversion reaction to convert between the first and second compositions within the water stability window.

6 Claims, 2 Drawing Sheets

(51) Int. Cl.
    *C02F 5/00*    (2023.01)
    *C02F 1/46*    (2023.01)

(56) References Cited

U.S. PATENT DOCUMENTS

| | | | |
|---|---|---|---|
| 9,722,247 | B2 | 8/2017 | Zhang et al. |
| 2012/0289887 | A1 | 11/2012 | Visco et al. |
| 2013/0244100 | A1 | 9/2013 | Tan et al. |
| 2015/0274555 | A1* | 10/2015 | Volkel .................. C02F 1/4604 |
| | | | 205/746 |
| 2016/0118683 | A1 | 4/2016 | Nakanishi |
| 2017/0001885 | A1 | 1/2017 | Verschueren |
| 2018/0305273 | A1 | 10/2018 | Patel et al. |

FOREIGN PATENT DOCUMENTS

| | | |
|---|---|---|
| DE | 698 30 662 T2 | 5/2006 |
| KR | 2015-0041679 A | 4/2015 |
| WO | 2015177567 A1 | 11/2015 |

OTHER PUBLICATIONS

Baum, E. et al., "Structural and magnetic properties of the clinopyroxenes NaFeSi2O6 and LiFeSi2O6," Zeitschrift für Kristallographie Crystalline Materials, vol. 183, Issue 1-4, 1988, pp. 273-284 (12 pages).

Yabuuchi, N. et al., "Crystal Structures and Electrode Performance of Alpha-NaFeO2 for Rechargeable Sodium Batteries," Electrochemistry, 80 (10), 2012, pp. 716-719 (4 pages).

Chen, F. et al., "A dual-ion electrochemistry deionization system based on AgCl—Na0.44MnO2 electrodes," Nanoscale, 2017, 9, pp. 10101-10108 (8 pages).

Chen, F. et al., "Dual-ions electrochemical deionization: a desalination generator," Energy & Environmental Science, 2017, 10, pp. 2081-2089 (9 pages).

Gabrielli, C. et al., "Electrochemical water softening: principle and application," Desalination, 201, 2006, pp. 150-163 (14 pages).

Etheredge, K. M. S. et al., "Synthesis of a New Layered Sodium Copper (II) Pyrophosphate, Na2CuP2O7, via an Eutectic Halide Flux," Inorg. Chem., 34 (6), 1995, pp. 1495-1499 (5 pages).

Nestola, F. et al., "Compressibility of NaMnSi2O6: The role of electronic isovalency for the validity of bulk modulus evolume relationship," Solid State Science, 14, 2012, pp. 1036-1039 (4 pages).

Liu et al., "Preparing CNTs/Ca-Selective zeolite composite electrode to remove calcium ions by capacitive deionization," Desalination 326, (2013), pp. 109-114 (6 pages).

Vassilaras et al., "Electrochemical Properties of Monoclinic NaNiO2," Journal of the Electrochemical Society, Nov. 28, 2012, vol. 160, No. 2, DOI 10.1149/2.023302jes (6 pages).

Billaud et al., "NaMnO2: A High-Performance Cathode for Sodium-Ion Batteries," Journal of the American Chemical Society, 2014, vol. 136, No. 49, pp. 17243-17248 (12 pages).

* cited by examiner

CONVERSION MATERIALS FOR ELECTROCHEMICAL WATER SOFTENING

This application claims the benefit of U.S. Provisional Application 62/749,087, filed Oct. 22, 2018, the disclosure of which is incorporated herein by reference in its entirety.

FIELD

The disclosure relates to electrochemical treatment of water and more particularly to electrode conversion materials for an electrochemical water softening device.

BACKGROUND

The demand for fresh, potable water is substantial and increasing due to population grown. This growing demand creates a substantial market for desalination and other purification activities especially since the vast majority of the Earth's available water is "saline water" (approximately 97.5%), which typically has salt concentrations that are too high for human consumption. Saline water includes ocean water as well as "brackish water," which contains more salt than fresh water but less salt than ocean water. Much of the remaining available "fresh water" is locked up in ice (glaciers and ice caps) and in the ground. The scarcity of fresh water resources and the need for additional water supplies is already critical in many arid regions of the world and will be increasingly important in the future.

There are a variety of existing techniques for removing ions from water, each with advantages and disadvantages that make the different technologies more or less desirable for a given application. Reverse osmosis (RO) and modern thermal distillation are techniques that are effective at comprehensive, non-selective removal of ions from water (i.e., deionization). Since these techniques remove water from salts, they are most advantageous when the initial ion load is quite high such as in the case of ocean water desalination. However, RO and thermal distillation techniques suffer from generally high cost due to the significant energy inputs required so these techniques are typically not recommended for purification of brackish water sources with lower ion loads.

Another technique for removing ions from water includes electrochemical technologies such as electrodialysis or electroabsorption. These techniques typically remove ions from feed water using ion-exchange membranes and/or high-surface-area carbon in connection with an applied potential to attract ions out of the water to an electrode and to limit desorption. Capacitive deionization (CDI) has been suggested as a useful electrochemical process for purifying water from brackish water sources since purification of brackish water typically only requires partial removal of ions from the water stream.

A CDI device typically includes a cathode and an anode. During a purification cycle, cations are added to the cathode and anions are added to the anode. The next cycle applies a voltage to flush the ions out of the electrodes, expelling an impurity-heavy wastewater. The electrodes are then available for the next purification cycle. One challenge to expanding CDI for use in desalination of brackish water sources is to identify appropriate anode materials that can take chlorine ($Cl^-$) and/or other anions from the water in the purification cycle, and then reversibly discharge it in a regeneration cycle.

Desalinated water as well as fresh water from traditionally safe sources such as municipal water sources or potable water from wells may nonetheless possess qualities that are less desirable to the water consumer. For instance, such water can vary significantly with respect to taste, odor, turbidity, bacterial and/or viral contamination, heavy metal contamination, hardness, mineral deposits, and/or a combination of these water quality parameters. The quality parameter of water hardness relates to the concentration of calcium ions ($Ca^{2+}$) and/or magnesium ions ($Mg^{2+}$) present in a given volume of water. Calcium and/or magnesium exist in water in the form of salts, which are normally soluble in the form of sulfates, carbonates, bicarbonates, or chlorides. The soluble salts are often ionized so that the water contains a relatively high concentration of calcium ions and/or magnesium ions.

Water is typically classified according to hardness as "soft water" or "hard water." The harder the water, the greater the concentration of calcium and/or magnesium ions per volume. Hard water is typically undesirable because it can cause scale buildup in plumbing, fixtures, and appliances and may affect the performance these systems and devices. For instance, the heat from a hot water heater removes some calcium carbonate and magnesium carbonate from the water, resulting in scale buildup that can slow the heating process and increase energy usage. Cleaning agents used with hard water are often less effective. Clothes washed in hard water may become dingy and gray with time and feel harsh or scratchy. Glassware may become spotted as it dries. Films may be left on shower doors or curtains, walls, and tubs, and hair washed in hard water may look dull and not feel clean. Hard water is especially problematic in manufacturing or industrial contexts. The process of removing calcium ions and/or magnesium ions from hard water is commonly referred to as water softening.

The most common technology for water softening is ion exchange. In an ion exchange softening system, the softening device when active uses an ion exchange resin to replace calcium ions and/or magnesium ions in a feed water stream with sodium ions. The ion exchange resins or zeolites contain weakly-bound sodium atoms that can exchange with calcium to "soften" the water by undergoing the reaction $XNa_2+Ca^{2+} \rightarrow XCa+2Na^+$. Water softened via ion exchange does have some disadvantages. For instance, ion exchange resins must be periodically recharged by processing them in a high-sodium solution, such as sodium hydroxide or extremely salty water. This requires action by the user to routinely add salt to the system to maintain system efficiency, which can be a burden to the user.

What is needed, therefore, are electrode conversion materials configured to remove calcium or magnesium ions in a reversible manner for use in a water softening process. A water softening device that includes the electrode conversion materials would be further advantageous.

SUMMARY

A water softening device in one embodiment includes a container, a first electrode, and a power source. The container is configured to contain a water solution that has a first concentration $c_1$ of free calcium ions. The first electrode is arranged in fluid communication with the water solution. The first electrode includes a conversion material that has a first composition and a second composition coexisting with the first composition. The first composition includes calcium ions bonded thereto and the second composition includes sodium ions bonded thereto. The power source is configured to supply current to the first electrode in a first operating state such that the second composition exchanges the bonded sodium ions for the free calcium ions in the water solution and converts to the first composition to generate a soft water solution that has a second concentration $c_2$ of the free calcium ions. The first electrode is configured to be electrically connected to a load in a second operating state such that the first composition exchanges the bonded calcium ions for free sodium ions in the water solution and converts to the second composition to generate a wastewater solution that has a third concentration $c_3$ of the free calcium ions. The third concentration $c_3$ is greater than the first concentration $c_1$, which in turn is greater than the second concentration $c_2$.

A conversion electrode in one embodiment for a water softening device includes a conversion material that has a first composition and a second composition coexisting with the first composition. The first composition includes calcium ions bonded thereto and the second composition includes sodium ions bonded thereto. The conversion material is configured to be at least partially immersed in a water solution and undergo a conversion reaction in which the first composition exchanges the bonded calcium ions for free sodium ions in the water solution and converts to the second composition in a first operating state of the conversion electrode. The conversion reaction is reversible such that the second composition exchanges the bonded sodium ions for free calcium ions in the water solution and converts to the first composition in a second operating state of the conversion electrode.

DETAILED DESCRIPTION

Figure 1:
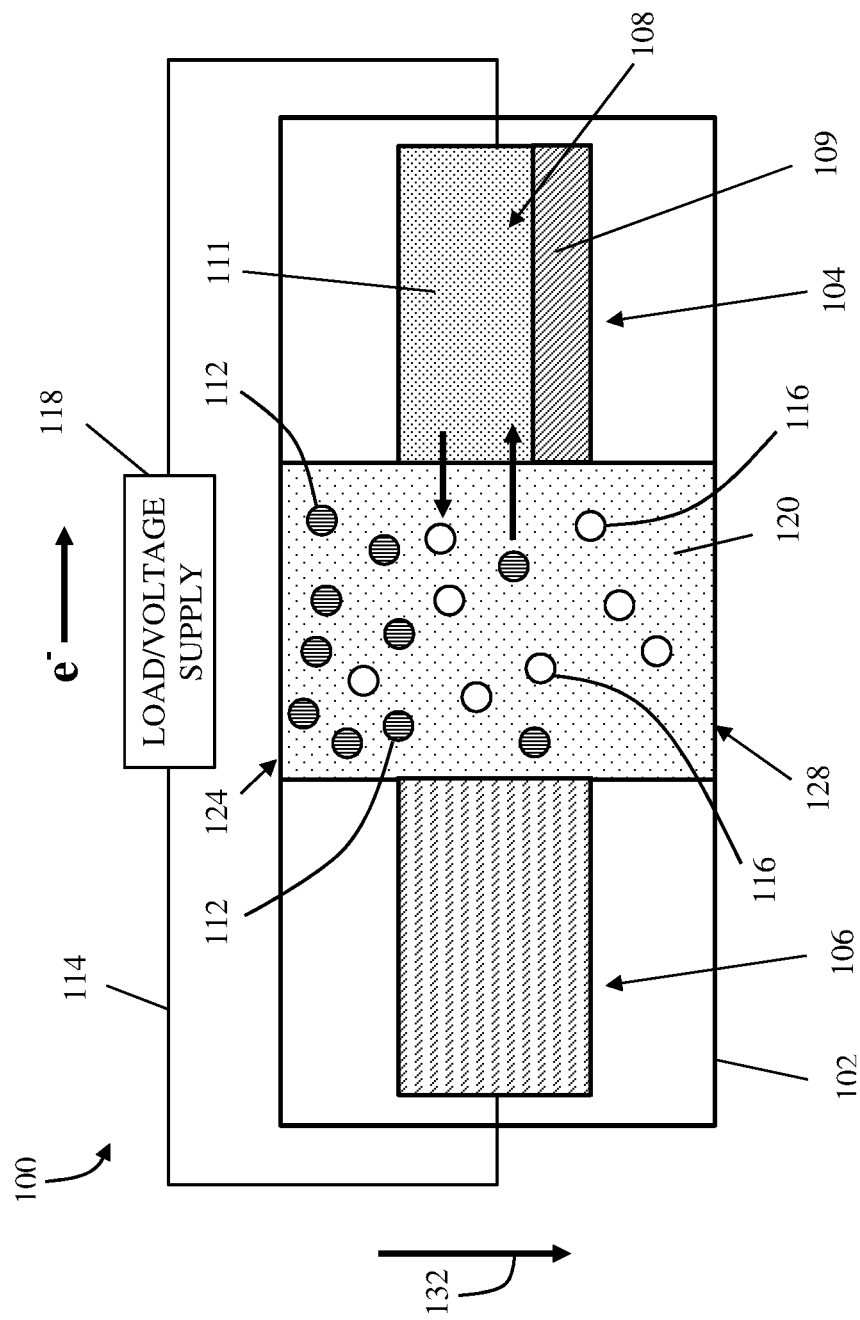
FIG. 1 depicts a schematic diagram of a water softening device according to one embodiment, the device shown in a first operating state in which a voltage applied to an electrode of the device causes a conversion material to exchange first cations for second cations in a water solution.

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

Figure 2:
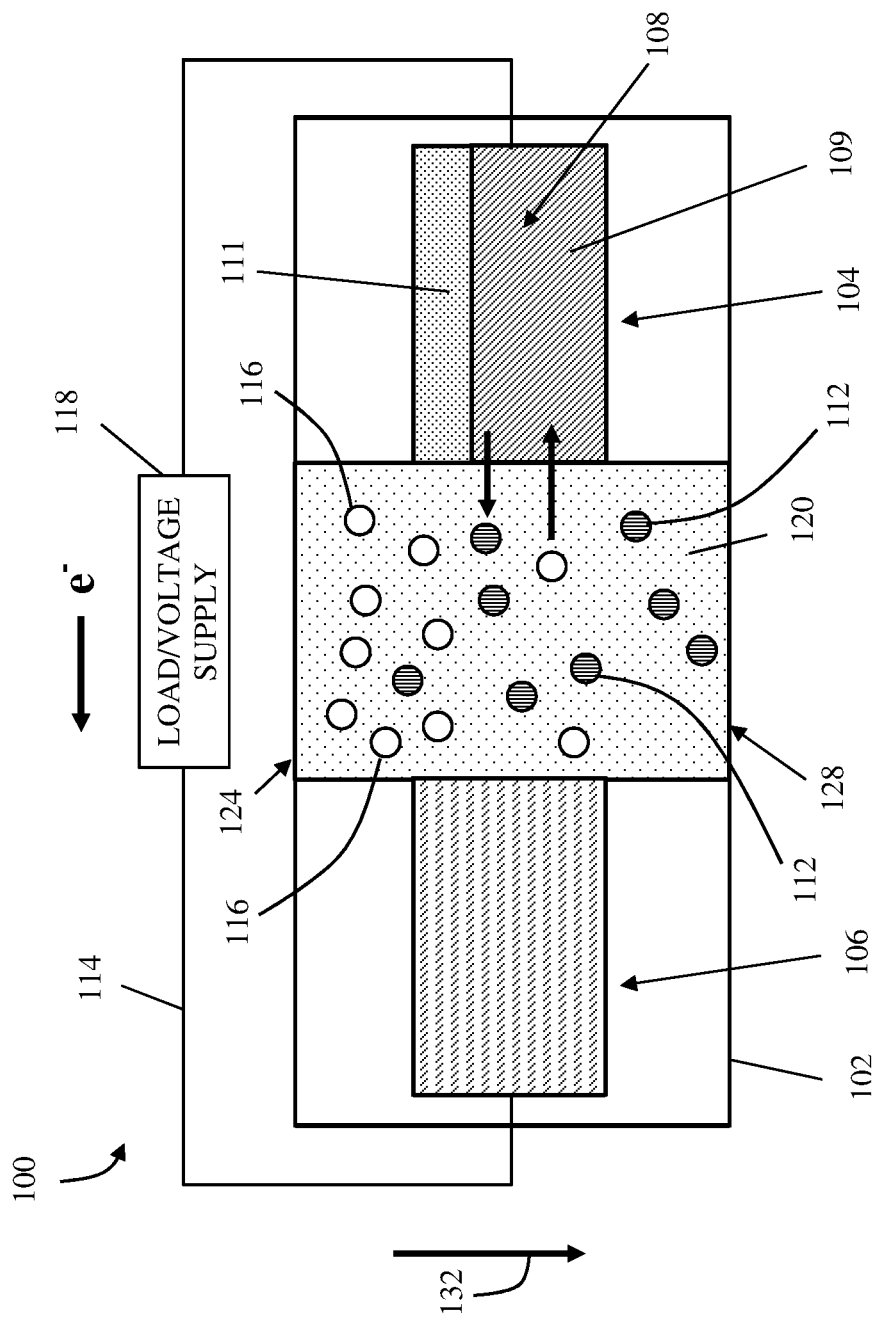
FIG. 2 depicts the device of FIG. 1 in a second operating state in which the electrode is induced to reversibly exchange the second cations for the first cations in the water solution.

FIGS. 1 and 2 illustrate a device 100 configured to remove ions from a water supply. The device 100 includes a first electrode 104 with a conversion material 108 configured to reversibly exchange first target ions 112 and second target ions 116 in different operating states of the device via a reversible conversion reaction. The first target ions 112 in the illustrated embodiment include the cation $Ca^{2+}$ though in other embodiments the first target ions 112 can be other target ions. The second target ions 116 in the illustrated embodiment include the cation $Na^+$ though in other embodiments the second target ions 116 can be other target ions. The device 100 shown in FIGS. 1 and 2 also includes a second electrode 106 operatively and electrically connected to the first electrode 104 via an external circuit 114. The second electrode 106 is configured as an electron donor/acceptor depending on the operating state of the device 100 and includes an active material. The device 100 further contains a power source, current source, or voltage source 118 configured to supply electric current to the first and second electrodes 104, 106. The electric current can be constant current. The electric current is applied to remove the target ions from the water supply.

The conversion material 108 disclosed herein was identified using a materials database known as The Materials Project, which lists crystal structures and density-functional-theory (DFT) energies for materials. The materials database was used to compute the stability and voltage for electrochemical-softening materials. The convex-hull energy gives the stability of the material, or the energy gained if the material decomposes into other compounds. For example, the compound AgCl has a convex-hull energy of 0, which means that it would gain no energy to turn into another compound. However, the compound $ZnO_2$ in the (Pa-3) phase has a convex-hull energy of 0.143 eV/atom, which means that it would gain 0.143 eV/atom to decompose into ZnO ($P6_3mc$) and $O_2$ gas.

The half-cell potential is computed using the following half-cell reaction:

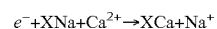

$$e^- + XNa + Ca^{2+} \rightarrow XCa + Na^+$$

The energy relative to the standard hydrogen electrode (SHE) is found with the knowledge that calcium dissolution occurs at −2.868 V and sodium at −2.71 V, or equivalently:

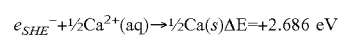

$$e_{SHE}^- + \tfrac{1}{2}Ca^{2+}(aq) \rightarrow \tfrac{1}{2}Ca(s) \quad \Delta E = +2.686 \text{ eV}$$

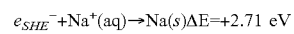

$$e_{SHE}^- + Na^+(aq) \rightarrow Na(s) \quad \Delta E = +2.71 \text{ eV}$$

The energies of XNa and XCa are given by the DFT energies of formation for each. The energies of formation of Ca and Na solids are zero by definition. All calculations are performed in the dilute limit.

For this reaction to occur, the system must overcome the energy barrier between the initial and final states. This energy barrier loosely corresponds to the overpotential or bias necessary for the reaction to occur, but is more difficult to calculate because the transition state(s) must be known and their energies computed. The compatibility between two crystal structures is approximated by using the space group. If the replacement of Na for Ca retains the symmetries of the space group, or increases the symmetries of the space group, the two structures are likely compatible in a reversible reaction. Otherwise, they are likely incompatible, as the reaction likely involves significant diffusion within the host lattice (high energy barrier), instead of a purely martensitic transformation in the host lattice (lower energy barrier).

The conversion material 108 disclosed herein includes materials that (1) contain no toxic or expensive elements; (2) are stable compounds; (3) are stable in water, (4) have a low overpotential (voltage hysteresis) for the reduction and oxidation processes; and (5) are processable. The requirements of (1) limit the materials to certain elements. The requirements of (2) limit the maximum convex-hull energy of the materials. However, materials with a convex-hull energy slightly larger than zero can be sufficient due to prediction uncertainties in the materials database, effects of temperature, and hysteresis. The requirements of (3) limit half-cell potentials to within a particular range relative to the SHE. Although water is stable between −0.8 to 1.23 V (depending on pH), the selection of cathode will affect the anode voltage reversal, so the electrochemical window is taken to be larger. Additionally, uncertainties in the calculations motivate a slightly larger electrochemical window. The requirements of (4) are approximated by symmetric considerations given above. Additionally, the crystal structures of the materials are examined afterwards.

In view of the above parameters, the conversion material 108 is limited to materials that (1) contain one or more of aluminum (Al), calcium (Ca), chlorine (Cl), copper (Cu), iron (Fe), hydrogen (H), potassium (K), magnesium (Mg), manganese (Mn), sodium (Na), nickel (Ni), phosphorus (P), silicon (Si), tin (Sn), zinc (Zn), and oxygen (O); (2) have the same amount of each element (except for Na and Ca) between the sodiated and calciated compounds; (3) are stable within 0.1 eV from the convex hull; (4) have crystal structure similarity such that the space group of the sodiated material is the same space group or a subgroup thereof as the calciated material; (5) have a voltage bias between −1.0 to 1.5 V relative to the SHE; (6) both the calciated and sodiated versions are in the materials database; and (7) are not readily known to be soluble in water (>1 g/100 mL).

The conversion material 108 disclosed herein is at least one of the following materials.

Phosphate-Based Materials $NaXP_2O_7 + Ca^{2+} + e^- \rightarrow CaXP_2O_7 + Na^+$ (Material 1) is predicted at approximately 0.9-1.5 V RHE for X=Cu (depending on the phase of the calcium copper phosphate) and 0.0 V RHE for X=Fe. Additionally, a Cu/Fe mixture can also be stable and have a voltage in the desired range.

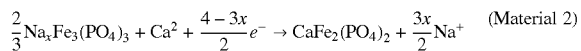

$$\frac{2}{3}Na_xFe_3(PO_4)_3 + Ca^{2+} + \frac{4-3x}{2}e^- \rightarrow CaFe_2(PO_4)_2 + \frac{3x}{2}Na^+ \quad \text{(Material 2)}$$

is predicted at approximately 0.1 V for x=2 and 0.5 V for x=1 RHE.

$NaMn_xP_xO_{4x+1} + Ca^{2+} + e^- \rightarrow CaMn_xP_xO_{4x+1} + Na^+$ (Material 3) is predicted at approximately 1.08 (x=2) to 1.1 (x=3) V RHE.

Other Materials $NaMg_xMO_y + Ca^{2+} + e^- \rightarrow CaMg_xMO_y + Na^+$ (Material 4) has the stable compositions identified in Table 1 though other stable compositions are possible.

TABLE 1

| x: Mg:M | y: O:M | M | Predicted voltage (V RHE) | Notes |
|---|---|---|---|---|
| 30 | 32 | Fe | −0.2 to 1.5 | Depending on phase |
| 14 | 16 | Mn | −0.4 | |
| 6 | 8 | Mn | −0.3 to −0.5 | Depending on phase |

$Na_xFe(SiO_3)_2 + z\ Ca^{2+} + (2z-y)e^- \rightarrow Na_{x-y}Ca_zFe(SiO3)_2 + y\ Na^+$ (Material 5) has the stable compositions identified in Table 2 though other stable compositions are possible.

TABLE 2

| x: Na:Fe | y: Na⁺:Fe | z: Ca:Fe | Predicted voltage (V RHE) | Notes |
|---|---|---|---|---|
| 0.9 | 0.3 | 0.4 | −0.4 | |
| 0.833 | 0.333 | 0.5 | 0.2 | |
| 1.0 | 1.0 | 1.0 | −0.3 | |

TABLE 2-continued

| x: Na:Fe | y: Na⁺:Fe | z: Ca:Fe | Predicted voltage (V RHE) | Notes |
|---|---|---|---|---|
| 0.833 | 0.833 | 0.5 | 1.0 | |
| 0.5 | 0.5 | 0.5 | 1.67 | |
| 1.0 *Mn | 1.0 *Mn | 1.0 *Mn | 0.24 | Replacing the Fe by Mn |

$Na_xMnO_2 + y\ Ca^{2+} + (2y-x)e^- \rightarrow Ca_yMnO_2 + x\ Na^+$ (Material 6) has the stable compositions identified in Table 3 though other stable compositions are possible.

TABLE 3

| x: Na:Mn | Ca:Mn | Predicted voltage (V RHE) | Notes |
|---|---|---|---|
| 1.0 | 1/16 | −0.5 | |
| 0.125 | 0.125 | 0.0 | |
| 0.25 | 0.25 | −0.2 | |
| 11/24 or 7/16 | 0.25 | −0.5 | |
| 0.25 | 0.333 | 0.3 | |
| 0.1 | 0.5 | 0.3 | |
| 0.15 | 0.5 | 0.2 | |
| 0.25 | 0.5 | −0.2 | |
| 0.44 to 0.5 | 0.5 | 0.0 | Can be as high as 0.5 RHE depending on CaMn₂O₄ phase |
| 0.125 to 1.0 | 1.0 | −0.3 | |

$Na(MO_2)_2 + Ca^{2+} + e^- \rightarrow Ca(MO_2)_2 + Na^+$ (Material 7) is predicted at approximately 0.8 V RHE for M=Fe and 0.6 V RHE for M=Ni. If the sodiated compound is $Na_xNiO_2$ and the calciated compound is $Ca(NiO_2)_2$, the voltage can range between 0.3 V (x=0.28) to 1.1 V (x=0.889). In one embodiment, the conversion material in the form of Material 7 converts between $NaNiO_2$ and $Ca(NiO_2)_4$.

The second electrode 106 can be a reducing agent that that reversibly releases $H^+$ into the water solution or absorbs $CO_3^-$ from the water solution. In one example, the half-cell reaction is essentially releasing a proton into the water solution such that when $Ca^{2+}$ is removed from the water solution. $Na^+$ and $H^+$ are released into the water solution via the reducing agent. In another example, $CO_3^-$ is absorbed from the water solution via reduction or intercalation into the second electrode 106. Another example includes use of a reversible reducing agent such as a known reversible reducing agent. Some further examples use hydride (YH) and carbonate (YCO₃). In some embodiments, the second electrode 106 has an intercalation structure including $K_{0.27}MnO_2$, γ-$MnO_2$, $MoO_3$. Prussian blue and Prussian blue analog—i.e., hexacyanoferrate (HCF) or hexacyanomanganate (HCM): e.g., NiHCF, NiCuHCF, and MnHCM.

The first electrode 104 can include the conversion material 108 of any one of Materials 1-7 as well as additives for stability, conductivity, and/or other physical properties. The second electrode 106 can also include additives for stability, conductivity, and/or other physical properties in addition to the active material. The electrode(s) can include active material in the amount of about 70 to 99 wt. %, 75 to 97 wt. %, or 60 to 95 wt. %, based on the total weight of the electrode. The electrode(s) can include one or more conductivity agents in the amount of about 1 to 40 wt. %, 2.5 to 30 wt. %, or 5 to 20 wt. %, based on the total weight of the electrode. The electrode(s) can include one or more polymeric binders in the amount of about 1 to 30 wt. %, 2.5 to 20 wt. %, or 5 to 15 wt. %.

A non-limiting example of a conductivity agent can include carbon black, conductive carbon black, amorphous carbon, carbon fibers, quaternary ammonium salt(s), alkyl sulfonate(s), halogen-free cationic compound(s), the like, or a combination thereof.

A non-limiting example of a polymeric binder can be polyvinylidene fluoride (PVdF), polyacrylonitrile (PAN), poly(methyl methacrylate) (PMMA), polyethylene glycol (PEO), polyimide, polydopamine, poly(ethylene glycol) diacrylate, polymethylpentene, nylon, metal-aramid, polyether imide, copolyester, polyetherketone, carboxymethyl cellulose, styrene-butadiene rubber (SBR), copolymers and blends such as poly(vinylidenefluoride-hexafluoropropylene) (PVdF-HFP), poly(vinylidenefluoride-chlrotrifluoroethylene) (PVdF-CTFE), poly(methyl methacrylate-vinyl acetate) (PMMA-VAc), poly(ethylene glycol) diacrylate (PEGDA), poly(methyl methacrylate-acrylonitrile-vinyl acetate) (PMMA-AN-VAc), poly(methyl methacrylate-co-butyl acrylate) (PMMA-co-BA), poly(3,4-ethylenedioxythiophene) polystyrene sulfonate-co-polyethylene glycol (PEDOT-co-PEG), the like, or a combination thereof.

With continued reference to FIGS. 1 and 2, the device 100 in some embodiments is arranged in a water supply system (not shown) that includes various pumps, conduits, valves, and related components to transport water from a source to an end user. The device 100 in one embodiment includes a container 102 arranged in the water supply system such that a water solution 120 enters the container 102 at an input side 124 and exits the container at an output side 128.

The container can be a container, compartment, housing, vessel, can, canister, tank, or the like of any shape, size, or configuration capable of obtaining, retaining, holding, and/or releasing a liquid solution such as saline water, brackish water, sea water, ocean water, fresh water, sweet water, drinking water, desalinated water, contaminated water, industrial water, etc. The container is spacious enough to house a sufficient amount of a water solution undergoing water softening; dimensions thus differ based on a specific application. The container can be large enough to serve industrial applications. The container can be made from different materials capable of withstanding corrosion, temperature fluctuations, changing pH, varying pressure, and be resistant to other chemical, mechanical, and/or physical conditions.

The container can be made from glass, plastic, composite, metal, ceramic, or a combination of materials. The container may feature one or more protective coatings. The container may be made from a material which minimizes occurrence of water contamination. The container may be made from material(s) which are nontoxic and comply with drinking water standards.

As the water solution 120 moves in a flow direction 132 through the device 100 and over at least a portion of the first electrode 104, the device 100 is configured to have different operating states so as to enable it to reversibly exchange the first target ions 112 and the second target ions 116. The flow direction 132 shown in FIGS. 1 and 2 is for reference only and can be reversed in other embodiments. If the flow direction is reversed, the locations of the input side 124 and the output side 128 of the device will be reversed as well.

FIG. 1 illustrates the device 100 in a first operating state in which a voltage is applied to the first electrode 104 while the water solution 120 flows through the device 100 in the flow direction 132. In the first operating state, the first electrode 104 exchanges the second target ions 116 (i.e., sodium ions) bonded to the material 108 for the first target ions 112 (i.e., calcium ions) in the water solution 120 via the voltage-induced reaction: $XNa+Ca^{2+}+e^- \rightarrow XCa+Na^+$. During this reaction, the first target ions 112 are removed from the water solution 120 and become bonded to the material 108 of the first electrode 104 while the second target ions 116 are released from the material 108 and added to the water solution 120. The water solution 120 that exits the output side 128 of the device 100 when the device is operated in the first operating state contains a lower concentration of the first target ions 112 than the water solution that enters the input side 124 of the device 100. In the embodiment in which the first target ions 112 are the divalent cation $Ca^{2+}$, the water solution 120 exiting the device 110 will be a softened water solution. The first operating state of the device 100 is sometimes referred to as a "purification cycle" since the removal of the first target ions 112 purifies the water stream exiting the device 100. In some embodiments, the second electrode 106 is configured to remove the second target ions (i.e., sodium ions) via intercalation, adsorption, or similar means during the purification cycle. The voltage applied to the first and second electrodes 104, 106 in the first operating state is configured to be within −1.0 to 1.5 V, which is slightly larger than the stability window of water (i.e., −0.8 to +1.23 V vs. SHE), so as to avoid water electrolysis.

FIG. 2 illustrates the device 100 in a second operating state in which the voltage is no longer applied to the first electrode 104 and the first electrode 104 is electrically connected to a load. The second operating state in some embodiments includes immersing the first electrode 104 in a mild saltwater solution. In the second operating state, the first electrode 104 exchanges the first target ions 112 (i.e., calcium ions) bonded to the material 108 for the second target ions 116 (i.e., sodium ions) in the water solution 120 via the electrochemically-induced reaction: $XCa+Na^+ \rightarrow XNa+Ca^{2+}+e^-$. During this reaction, the second target ions 116 are removed from the water solution 120 and become bonded to the material 108 of the first electrode 104 while the first target ions 112 are released from the material 108 and added to the water solution 120. The second operating state of the device 100 cleans or refreshes the first electrode 104 for a subsequent purification cycle. The second operating state is sometimes referred to as a "wastewater cycle" since it adds the first target ions 112 back into the water stream exiting the device 100. The device 100 is easier to recharge in the second operating state using a mildly-salty solution because the Na/Ca ion exchange can be biased in favor of absorbing calcium (during softening) or sodium (during recharging).

In view of the half-cell reactions disclosed herein for each of Materials 1-7, it will be appreciated that a composition of the conversion material 108 varies during operation of the device 100 such that the conversion material 108 includes a base compound portion with a calciated version and a sodiated version coexisting with the calciated version. For example, using a specific variant of Material 1 in which X=Cu, the conversion material 108 in the first electrode 104 has a first composition 109 of $CaCuP_2O_7$ and a second composition 111 of $NaCuP_2O_7$ coexisting with $CaCuP_2O_7$ during operation of the device 100. In this example, the device 100 converts $NaCuP_2O_7$ to $CaCuP_2O_7$ during the purification cycle depicted in FIG. 1 and converts $CaCuP_2O_7$ to $NaCuP_2O_7$ during the wastewater cycle depicted in FIG. 2. The conversion material 108 has different relative percentages of $CaCuP_2O_7$ and $NaCuP_2O_7$ at the start and end of the purification and wastewater cycles. In some embodiments, the device 100 is operated in the purification cycle to convert the conversion material 108 over a wide percent range of $CaCuP_2O_7$ to $NaCuP_2O_7$, such as from 10%/90% to 90%/10%. The device in other embodiments is operated to convert the conversion material 108 over a narrow percent range of $CaCuP_2O_7$ to $NaCuP_2O_7$, such as from 40%/60% to 60%/40%. It will be appreciated that other ranges, which are larger or smaller than those indicated, are contemplated.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A conversion electrode for a water softening device, comprising:
    a conversion material having a first composition and a second composition coexisting with the first composition, the first composition including calcium ions bonded thereto and the second composition including sodium ions bonded thereto,
    wherein the conversion material is configured to be at least partially immersed in a water solution and undergo a reversible conversion reaction in which (i) the first composition exchanges the bonded calcium ions for free sodium ions in the water solution and converts to the second composition in a first condition of the conversion electrode and (ii) the second composition exchanges the bonded sodium ions for free calcium ions in the water solution and converts to the first composition in a second condition of the conversion electrode, and
    wherein the first composition includes at least 10 percent by weight of a compound represented by the formula $CaMg_xMO_y$, and the second composition includes at least 10 percent by weight of a compound rrepresented by the formula $NaMg_xMO_y$, where x, y, and M have the values in any one row of the following table:

| x | y | M |
|---|---|---|
| 30 | 32 | Fe |
| 14 | 16 | Mn |
| 6 | 8 | Mn. |

2. A conversion electrode for a water softening device, comprising:
    a conversion material having a first composition and a second composition coexisting with the first composition, the first composition including calcium ions bonded thereto and the second composition including sodium ions bonded thereto,
    wherein the conversion material is configured to at least partially immersed in a water solution and undergo a reversible conversion reaction in which (i) the first composition exchanges the bonded calcium ions for free sodium ions in the water solution and converts to the second composition in a first condition of the conversion electrode and (ii) the second composition exchanges the bonded sodium ions for free calcium ions in the water solution and converts to the first composition in a second condition of the conversion electrode, and
    wherein the first composition includes at least 10 percent by weight of a compound represented by the formula $Ca_yMnO_2$ and the second composition includes at least 10 percent by weight of a compound represented by the formula $Na_xMnO_2$, where x and y have the values in any one row of the following table:

| x | y |
|---|---|
| 1.0 | 1/16 |
| 0.125 | 0.125 |
| 0.25 | 0.25 |
| 11/24 or 7/16 | 0.25 |
| 0.25 | 0.333 |
| 0.1 | 0.5 |
| 0.15 | 0.5 |
| 0.25 | 0.5 |
| 0.44 to 0.5 | 0.5 |
| 0.125 to 1.0 | 1.0. |

3. A conversion electrode for a water softening device, comprising:
    a conversion material having a first composition and a second composition coexisting with the first composition, the first composition including calcium ions bonded thereto and the second composition including sodium ions bonded thereto,
    wherein the conversion material is configured to be at least partially immersed in a water solution and undergo a reversible conversion reaction in which (i) the first composition exchanges the bonded calcium ions for free sodium ions in the water solution and converts to the second composition in a first condition of the conversion electrode and (ii) the second composition exchanges the bonded sodium ions for free calcium ions in the water solution and converts to the first composition in a second condition of the conversion electrode, and
    wherein the first composition includes at least 10 percent by weight of a compound represented by the formula $Ca_x(MO_2)$ and the second composition includes at least 10 percent by weight of a compound represented by the formula $Na_y(MO_2)$, where x, y, and M have the values in any one row of the following table:

| x | y | M |
|---|---|---|
| 0.5 | 0.5 | Fe |
| 0.5 | 0.25 to 0.9 | Ni |
| 0.25 | 1.0 | Ni. |

4. The conversion electrode of claim 3, wherein a voltage of the conversion electrode in the first and second conditions is within a range of −1.0 V to 1.5 V.

5. The conversion electrode of claim 1, wherein a voltage of the conversion electrode in the first and second conditions is within a range of −1.0 V to 1.5 V.

6. The conversion electrode of claim 2, wehrein a voltage of the conversion electrode in the first and second conditions is within a range of −1.0 V to 1.5 V.

* * * * *

UNITED STATES PATENT AND TRADEMARK OFFICE
CERTIFICATE OF CORRECTION

PATENT NO. : 11,884,560 B2
APPLICATION NO. : 16/591199
DATED : January 30, 2024
INVENTOR(S) : Kornbluth et al.

Page 1 of 1

It is certified that error appears in the above-identified patent and that said Letters Patent is hereby corrected as shown below:

In the Claims

In Claim 1, at Column 9, Lines 39-40: "rrepresented by" should read --represented by--.

In Claim 2, at Column 9, Line 56: "configured to at least" should read --configured to be at least--.

In Claim 6, at Column 10, Line 59: "wehrein" should read --wherein--.

Signed and Sealed this
Thirtieth Day of July, 2024

Katherine Kelly Vidal
*Director of the United States Patent and Trademark Office*